(12) United States Patent
McCracken et al.

(10) Patent No.: US 12,159,020 B2
(45) Date of Patent: Dec. 3, 2024

(54) INTELLIGENT APPLICATION-TAB STACK RENDERING

(71) Applicant: INTERNATIONAL BUSINESS MACHINES CORPORATION, Armonk, NY (US)

(72) Inventors: Chloe McCracken, West Harrison, IN (US); Allison Kei Ishida, Alameda, CA (US); Diana Isabelle Ovadia, Camarillo, CA (US); Su Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 17/663,673

(22) Filed: May 17, 2022

(65) Prior Publication Data

US 2023/0376176 A1 Nov. 23, 2023

(51) Int. Cl.
*G06F 3/0483* (2013.01)
*G06F 3/04842* (2022.01)
*G06F 3/14* (2006.01)

(52) U.S. Cl.
CPC ........ *G06F 3/0483* (2013.01); *G06F 3/04842* (2013.01); *G06F 3/1446* (2013.01)

(58) Field of Classification Search
None
See application file for complete search history.

(56) References Cited

U.S. PATENT DOCUMENTS

| 7,376,907 B2* | 5/2008 | Santoro | G06F 9/451 715/729 |
| 7,596,760 B2* | 9/2009 | Sauve | G06F 3/04842 715/744 |
| 9,110,568 B2* | 8/2015 | Jitkoff | G06F 16/955 |

(Continued)

OTHER PUBLICATIONS

Kumar, et al., "Text summarization and visualization using IBM Watson Studio," IBM Developer [online], Jan. 10, 2019 [accessed on Jan. 3, 2023], 5 pages, Retrieved from the Internet: <URL: https://developer.ibm.com/patterns/text-summarization-topic-modelling-using-watson-studio-watson-nlu/>.

(Continued)

*Primary Examiner* — Tamara T Kyle
*Assistant Examiner* — Koorosh Nehchiri
(74) *Attorney, Agent, or Firm* — Robert D. Bean

(57) ABSTRACT

A method, a computer program product, and a computer system render a plurality of applications and tabs thereof on a plurality of displays. The method includes determining the applications and the tabs thereof that are open across the displays and keywords associated with the tabs. The method includes generating a data structure corresponding to a current view across the displays comprising information associated with the displays, the applications, the tabs, and summarized contents based on the keywords. The method includes monitoring a user operation context provided by a user indicative of requested information in a selected tab among the tabs. The method includes updating the data structure with the user operation context indicative of the selected tab, a corresponding application, and a corresponding display. The method includes rendering an updated view across the displays in which the selected tab is positioned to be viewed by the user.

20 Claims, 6 Drawing Sheets

(56) References Cited

U.S. PATENT DOCUMENTS

| | | |
|---|---|---|
| 9,430,124 B2 | 8/2016 | Schreiner |
| 9,971,847 B2 | 5/2018 | Bhupatiraju |
| 10,242,121 B2 | 3/2019 | Bhupatiraju |
| 10,558,336 B2 | 2/2020 | Fisher |
| 10,564,814 B2 | 2/2020 | Fang |
| 10,831,331 B2 | 11/2020 | Dunning |
| 11,106,756 B2* | 8/2021 | Chikkala ............... G06F 16/954 |
| 11,537,271 B2* | 12/2022 | Thomas ................ G06F 16/957 |
| 2003/0088562 A1* | 5/2003 | Dillon ................... G06F 16/951 707/999.005 |
| 2003/0120654 A1* | 6/2003 | Edlund ................. G06F 16/951 |
| 2006/0212441 A1* | 9/2006 | Tang ..................... G06F 16/951 707/999.005 |
| 2007/0261030 A1 | 11/2007 | Wadhwa |
| 2011/0131523 A1 | 6/2011 | Grant |
| 2012/0060083 A1* | 3/2012 | Yuan .................... G06F 16/957 715/234 |
| 2012/0159375 A1 | 6/2012 | Shaw |
| 2012/0174020 A1* | 7/2012 | Bell ...................... G06F 3/0481 715/779 |
| 2015/0220228 A1 | 8/2015 | Podemsky |
| 2016/0077695 A1 | 3/2016 | Singh |
| 2017/0075528 A1* | 3/2017 | Kothari ................ G06F 3/0482 |
| 2017/0293419 A1* | 10/2017 | Dipin ................... G06F 3/0483 |
| 2018/0225388 A1 | 8/2018 | Bhupatiraju |
| 2018/0321804 A1* | 11/2018 | Motghare ............. G06F 3/0482 |
| 2019/0324630 A1* | 10/2019 | Schwartz ............. G06F 40/186 |

OTHER PUBLICATIONS

Chrome Web Store, "Search All Tabs", https://chrome.google.com/webstore/detail/search-all-tabs/hdfnfhnlgoocpbbjjjfmiojdfcgcfomn, accessed Apr. 18, 2022, pp. 1-5.

Dubroy, "How Many Tabs do People Use?", https://dubroy.com/blog/how-many-tabs-do-people-use-now-with-real-data/, Apr. 13, 2009, pp. 1-12.

https://www.one-tab.com/, "OneTab", accessed May 17, 2022, pp. 1-3.

Kemp, "Digital Apr. 2021 Global Statshot Report", https://datareportal.com/reports/digital-2021-april-global-statshot, Apr. 21, 2021, pp. 1-39.

Mell et al., "The NIST Definition of Cloud Computing", National Institute of Standards and Technology, Special Publication 800-145, Sep. 2011, pp. 1-7.

Neild, "You Have a Million Tabs Open. Here's How to Manage Them", https://www.wired.com/story/how-to-organize-browser-tabs/, Sep. 6, 2020, pp. 1-7.

* cited by examiner

INTELLIGENT APPLICATION-TAB STACK RENDERING

BACKGROUND

The exemplary embodiments relate generally to displays, and more particularly to intelligently rendering a plurality of applications and/or tabs of the applications for viewing by a user.

A user may utilize a computing device that may include or be connected to a plurality of displays. The user may also install a plurality of applications to be executed on the computing device. Each application may be configured to provide a plurality of tabs or windows from which respective data may be shown to the user. In this manner, at any given moment, the user may have opened multiple applications each having multiple tabs that is shown across multiple displays. With so much data being shown, the user may forget where certain data is located among the tabs, among the applications, and/or among the displays. Accordingly, when a specific piece of data is being sought, the user may be required to inefficiently wade through the displays, applications, and tabs to locate the sought-after data.

SUMMARY

The exemplary embodiments disclose a method, a computer program product, and a computer system for rendering a plurality of applications and tabs thereof on a plurality of displays by an intelligent application-tab stack rendering (IATSR) module operating at an operating system level. The method comprises determining the applications and the tabs thereof that are open across the displays. The method comprises determining keywords associated with the tabs. The method comprises generating a summarized content for the tabs, the applications, and the displays based on the keywords. The method comprises generating a data structure corresponding to a current view across the displays comprising information associated with the displays, the applications, the tabs, and the summarized content. The method comprises monitoring a user operation context provided by a user. The user operation context is indicative of requested information. The requested information is included in a selected tab among the tabs. The method comprises updating the data structure with the user operation context. The updated data structure is indicative of the selected tab, one of the applications to which the selected tab belongs, and one of the displays on which the one of the applications is being shown. The method comprises rendering an updated view across the displays in which the selected tab is positioned to be viewed by the user.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
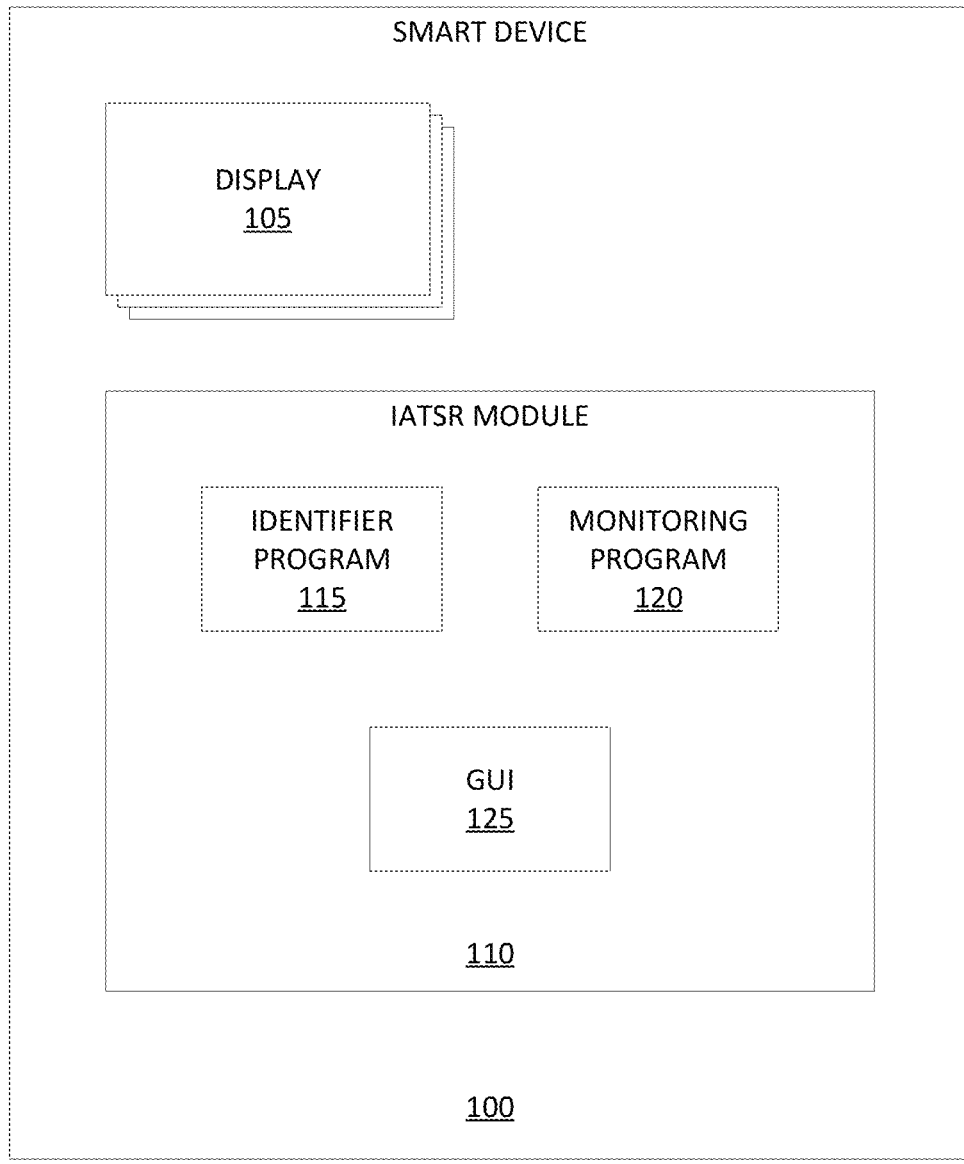
FIG. 1 depicts an exemplary schematic diagram of a smart device 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for rendering a plurality of applications and tabs thereof on a plurality of displays. The exemplary embodiments provide an intelligent application-tab stack rending (IATSR) mechanism that monitors the displays, the applications, and the tabs that are open. The IATSR mechanism may track a location of data being shown on the displays, the applications, and the tabs. The IATSR mechanism may also sort and move the tabs and applications among the displays as well as from a foreground to background or vice versa according to a relevance of a user context. As will be described in further detail below, the IATSR mechanism may operate at an operating system (OS) level to dynamically render the stacks of applications and tabs on the displays for an intelligent and productive viewing of data being shown in the tabs by the user so that the user is shown requested information included in a tab of an application on a display being viewed. Key benefits of the exemplary embodiments may include managing a substantial amount of data being shown across multiple displays/applications/tabs to enable a user to locate relevant tabs/applications/displays quickly and efficiently and also enable the user to utilize a graphical user interface (GUI) to provide a user context in re-sorting the tab/application stack for efficiently helping the user to visually manage/search/view all open tabs. Detailed implementation of the exemplary embodiments follows.

Conventional approaches have provided various ways to enable a user to navigate within an application. For example, a conventional approach may group content based web tabs where a subset of tabs for an application are positioned relative to one another within a viewing area of the application. In another example, a conventional approach may provide a search engine within an application to locate a tab of the application satisfying a search parameter. However, these conventional approaches merely provide a solution within an application itself without any consideration of other applications and their tabs. These conventional approaches also do not provide any further solution such as a reordering or rendering a solution for more productive viewing by the user. Further conventional approaches have provided mechanisms to share or view the tabs. For example, a conventional approach may allow a user to share a set of selected tabs where the user manually selects the tabs to be shared. In another example, a conventional approach may launch a new tab in an application next to a point of related tabs. In a further example, a conventional approach may reconfigure a user screen to include picture in picture. However, these conventional approaches again provide a solution within an application itself without any consideration of other applications and their tabs.

The exemplary embodiments are configured to provide the IATSR mechanism that dynamically renders stacks of all launched applications and respective tabs across a plurality of displays in a user interested order based on a user context in viewing the data. The IATSR mechanism according to the exemplary embodiments may operate at an OS level to manage the various applications and their tabs in this rendering operation. The IATSR mechanism may render the stacks through moving (e.g., within a display, across displays, etc.), through reordering (e.g., within an application), or any other reasonable viewing option available across the displays, across the applications, and/or across the tabs. In this manner, the IATSR mechanism of the exemplary embodiments may allow the user to quickly locate a most relevant application and tab based on a user context that is automatically placed in a correct one of the displays for immediate viewing by the user.

FIG. 1 depicts a smart device 100, in accordance with the exemplary embodiments. According to the exemplary embodiments, the smart device 100 may include one or more displays 105 and an IATSR module 110 that may include an identifier program 115, a monitoring program 120, and a GUI 125. The smart device 100 may be an enterprise server, a laptop computer, a notebook, a tablet computer, a netbook computer, a personal computer (PC), a desktop computer, a server, a personal digital assistant (PDA), a touchtone phone, a smart phone, a mobile phone, a virtual device, a thin client, an Internet of Things (IoT) device, or any other electronic device or computing system capable of executing applications and displaying data to a user. While the smart device 100 is shown as a single device, in other embodiments, the smart device 100 may be comprised of a cluster or plurality of computing devices, in a modular manner, etc., working together or working independently. The smart device 100 is described in greater detail as a hardware implementation with reference to FIG. 4 (e.g., data processing according to the exemplary embodiments being performed by processor 02) and/or as utilizing functional abstraction layers for processing with reference to FIG. 6 (e.g., workload layer 90 including rendering processing 96 according to the exemplary embodiments).

In the exemplary embodiments, the one or more displays 105 may be any device configured to show data to a user of the smart device 100. The exemplary embodiments are directed to applications being executed where each application has its own interface (e.g., a window) that may be configured for a plurality of sub-interfaces (e.g., tabs). As such, the displays 105 may shows these interfaces of the applications thereon. As illustrated, the displays 105 may be incorporated within a housing of the smart device 100 (e.g., as assembled in smart phones, personal digital devices, etc.). However, the incorporation of the displays 105 is only illustrative. In another exemplary implementation, one or more of the displays 105 may be modularly connected to the smart device 100 (e.g., a separate monitor connected to the smart device 100 via wired or wireless means). Accordingly, the smart device 100 may include incorporated ones of the displays 105, separate but connected ones of the displays 105, or a combination thereof. The displays 105 may also utilize any known mechanism (e.g., various LED technologies) to provide a visual interface to the user in showing data of the applications and tabs.

In the exemplary embodiments, the IATSR module 110 may be configured to determine a manner in which to render the applications and tabs thereof on the displays 105. By tracking a content of the applications and the tabs as well as their location on the overall viewing surface provided by the displays 105, the IATSR module 110 may be prepared to determine any updates to how the applications and tabs are to be shown on the displays 105. As will be described in further detail below, the IATSR module 110 may be configured to maintain a data structure incorporating the content of the applications and tabs thereof as well as the location on the displays 105. By also monitoring a user context, the IATSR module 110 may be configured to update the data structure. In updating the data structure, the IATSR module 110 may determine the updates on how the applications and tabs are to be shown on the displays 105 including the specific changes to view one or more of the applications and tabs. As noted above, the IATSR module 110 may include the identifier program 115, the monitoring program 120, and the GUI 125.

According to the exemplary embodiments, the IATSR module 110 may operate on an OS level. Through operation at the OS level, the IATSR module 110 may be configured to process the various information associated with the displays 105 and across the applications that are running on the smart device 100. Therefore, in contrast to application specific approaches to rendering a stack only for an application, the IATSR module 110 may address rendering application-tab stacks across the displays 105 and across the applications as well as any tabs that may be open on those applications. In this manner, the IATSR module 110 according to the exemplary embodiments may be configured on the OS level for managing multiple applications and tabs thereof on multiple displays to aid a user in quickly locating an intended or target application and/or tab.

In the exemplary embodiments, the identifier program 115 may be a software, hardware, and/or firmware based application performing identification operations for a variety of parameters including a content of the applications and tabs, a location determination of the applications and tabs, etc. The identifier program 115 may determine identifications of the tab, the application, and the displays 105 for each tab on each application that is open. The identifier program 115 may utilize a variety of manners in identifying the tabs, the applications, and the displays 105. For example, the identifier program 115 may generate identifiers to uniquely indicate the specific tab, the specific application, and the specific display 105.

The identifier program 115 may also be configured to perform summarization operations. The summarization operations may include determining a summarized content of the identified tabs, applications, and displays 105. In this manner, the identifier program 115 may determine a summarized content of an individual tab based on the information contained therein. The identifier program 115 may determine a summarized content of an individual application based on the content of each tab of that application. Each tab of an application may have a specific summarized content. In combining the summarized contents for each tab, the application may have a weight associated with the content of each tab. That is, the weight may be applied to the various content topics and/or keywords for which the summarized content relates. The identifier program 115 may further determine a summarized content of an individual one of the displays 105 based on the content of each application of that display 105. In this manner, the summarized content for the tabs, the applications, and the displays 105 may enable subsequent operations to be performed, especially based on the weights that may be determined for the applications (e.g., based on the tabs thereof), for the displays 105 (e.g., based on the applications thereof), etc.

The identifier program 115 may utilize various techniques to determine the summarized content. For example, the identifier program 115 may utilize any summarizing technique applied to text, video, audio, etc. In a particular implementation, the identifier program 115 may incorporate a natural language processing (NLP) mechanism for any text or input to which text may be determined (e.g., audio converted to text). In another particular implementation, the identifier program 115 may incorporate image analysis mechanisms in which images or portions thereof are identified and text is associated therewith. In another example, the identifier program 115 may process metadata of a tab to determine content used in determining the summarized content. In a further example, the identifier program 115 may be provided information for which the summarized content may be determined (e.g., manually entered information, information provided by an author of the tab, etc.).

The identifier program 115 may further be configured to perform assignment operations. As a result of performing the identification operations and determining the summarized content for the tabs, the applications, and the displays 105, the identifier program 115 may assign the identifications and the summarized content to the appropriate tab, application, and display 105. For example, the summarized content may be determined based on types of information such as content topics, keywords, etc. The identifier program 115 may assign these types of information to the appropriate tabs, applications, and displays 105.

In the exemplary embodiments, the monitoring program 120 may be a software, hardware, and/or firmware based application performing monitoring operations of conditions associated with rendering the applications and the tabs on the displays 105. As will be described in further detail below, the monitoring operations may include collecting user operation contexts that indicate relevant information in rendering the applications and the tabs on the displays 105.

In the exemplary embodiments, the user operation contexts may refer to any event and/or operation triggered by a user on a top of an OS level (e.g., as represented from user to application to operating system to hardware). In an exemplary embodiment, the user operation context may be determined based on user inputs utilizing any input device (e.g., keyboard, mouse, microphone, etc.). For example, the user operation context may be moving a cursor from one of the displays 105 to another one of the displays 105, switching an input method from one language to another language, determining a number of key strokes, determining when an event occurs such as launching or exiting an application or tab, activating or deactivating an application or tab, browsing a web page on an application, etc. In another example, the user operation context may be based inputs for interactions with specific applications such as a user viewed/watched/listened for search results, a time spent on a selected input (e.g., opening an email, instant message, etc. and requiring time to read), downloading/opening/reading an attachment from a communication, etc. With regard to the mechanism to collect the user operation context, the smart device 100 may utilize any of a variety of event handlers configured to extract and collect the user operation context as one skilled in the art will understand (e.g., a word processing application may be configured with an event handler to track documents that are recently opened, a browser application may be configured with an event handler that shows a browsing history, etc.).

As will be described in further detail below, the user operation context may also be determined based on a search request input in a search field of the IATSR module 110. A feature of the IATSR module 110 may include this search field that allows a user to directly request an application or tab having information corresponding to the search request. The search field of the IATSR module 110 will be described in further detail below. However, the use of a separate search field provided by the IATSR module 110 is only for illustrative purposes. The IATSR module 110 may also be configured to determine when a search request is entered in any field in a tab of an application (e.g., a browser search) for which the features of the exemplary embodiments may be implemented.

In another exemplary embodiment, the user operation context may be determined based on sensor measurements. For example, the smart device 100 may include an eye tracking device. The eye tracking device may track eye movements of the user to determine which of the displays 105 is being viewed, which application within the display 105 is being viewed, etc. In another example, the smart device 100 may include an audio input device that may interpret sounds from the user (e.g., a voice command may be received, a sound of frustration or confusion may be indicative of a request for particular information, etc.).

In the manner described above, the monitoring program 120 may utilize the input device information, the sensor information, or any other input from a variety of sources that are available on the smart device 100 to determine the user operation context.

The monitoring program 120 may also be configured to perform updating operations. In performing the monitoring operations, the monitoring program 120 may process the data to generate outputs corresponding to the information of the user operation context. The outputs may be incorporated into the data structure at a subsequent time, which will be described in further detail below.

In the exemplary embodiments, the GUI 125 may be a software, hardware, and/or firmware based application providing a user interface allowing the user of the smart device 100 to interact with the applications and tabs on the displays 105. The GUI 125 may also be configured to provide a specific interface for the IATSR module 110. For example, as noted above, the GUI 125 may include an interface in which a search field is provided such that the user may enter a search input.

The interface of the IATSR module 110 may be presented in a variety of manners. For example, the interface of the IATSR module 110 may be presented in an active one of the displays 105 (e.g., one of the displays 105 that the user is currently viewing based on the user operation context). In another example, the interface of the IATSR module 110 may be presented on each of the displays 105. In a further example, the interface of the IATSR module 110 may be presented upon entering an option to utilize this functionality (e.g., the search field appears at a mouse location when the option is exercised).

The GUI 125 may also be configured with a manager that maintains and updates the data structure for a service profile associated with the user of the smart device 100. As noted above, the data structure may incorporate the content of the applications and tabs thereof as well as the location on the displays 105. The data structure may include further information including the identifications of the applications, the tabs, and the displays 105, the keywords and content topics associated with the summarized content of the applications, the tabs, and the displays 105, etc. In a particular exemplary implementation, the data structure may include the displays 105, the identifications of the displays 105, the applications, the identifications of the applications, the tabs of the applications, the identifications of the tabs of the applications, and the content topics and the keywords, along with any metadata that indicates any relationship information (e.g., location in the displays). The data structure may further include categories of user operation context such as a timestamp of when an application was last used/was opened/was modified/etc., keystrokes being entered for a tab on an application, etc.

In maintaining the data structure, the manager may receive outputs from the monitoring application 120 related to user operation context that has been registered (e.g., since the data structure was last updated). The manager may determine how the data structure is updated based on the user operation context. As will be described below, the data structure may provide the basis upon which to render the application-tab stacks on the displays 105. Accordingly, in updating the data structure, the manager may indicate how to modify the views on the displays 105 for the applications and the tabs.

As a result of an update to the data structure, the IATSR module 110 may be configured to utilize a rendering daemon to update the view on the displays 105 according to the information in the data structure. The IATSR module 110 may process the data structure to initially determine whether the update to the data structure results in any modification to the view on the displays 105. For example, the data structure may be updated at predetermined intervals or continuously. However, in other exemplary embodiments, the data structure may be updated at other times such as after an event has occurred (e.g., a search request is entered in the search field of the interface of the IATSR module 110). In a further exemplary embodiment, the data structure may be updated through a combination of the aforementioned times. As a result of the data structure indicating that a change to the view on the displays 105 is to be performed, the IATSR module 110 may instruct the rendering daemon to effectuate the appropriate modification to the view.

In determining how to modify the current view on the displays 105 for the applications and the tabs, the IATSR module 110 may utilize a keyword based calculation. As noted above, the tabs, the applications, and the displays 105 may have a summarized content associated therewith where the summarized content of a tab is based on the information included in the tab, the summarized content of an application is based on the summarized content of the tabs of that application, and the summarized content of one of the displays 105 is based on the summarized content of the applications being shown on that display 105. For a given tab, the summarized content may include keywords and/or content topics indicative of the information that is being shown on that tab. For illustrative purposes, keywords and/or content topics will be referred to collectively as keywords. The keywords in the summarized content of the tabs may also be utilized in the keywords of a summarized content for an application and likewise for the displays 105 with respect to the keywords of the summarized content of the applications. The keywords may also be weighted to provide a relative degree with which a given one of the keywords is associated to the tab/application/display 105. Further weights may also be applied based on, for example, a number of tabs open for a given application, a number of applications displayed on a given one of the displays 105, etc. In this manner, as described above, combining the specific summarized content for each tab, the application may have a weight associated with the keywords of each tab.

With the keywords and the associated weights in the summarized content of the tabs/applications/displays 105, the IATSR module 110 may utilize the user operation context in the data structure to perform a keyword based calculation that indicates whether a modification to the view of the displays 105 is to be performed. For example, the user operation context may indicate a current one of the displays 105 that is being viewed along with a current application and a tab thereof. This tab being viewed may have a set of keywords associated therewith. The user operation context may also indicate requested information that has keywords associated therewith. For example, the user operation context may include a search request entered in the search field of the interface of the IATSR module 110. In this manner, the IATSR module 110 may perform operations based on a direct request from the user. In another example, the user operation context may be based on sensory information from the user. In an exemplary scenario, the user may be viewing a video and selects to pause the video due to a term or concept that is not fully understood. The IATSR module 110 may monitor these actions and also determine that the user has paused the video to search the term or concept that has recently occurred in the video. Thus, based on the content of the video prior to this pause time (e.g., a predetermined time duration, a dynamic time window based on the video, etc.), the IATSR module 110 may interpret a search request from the user. In this manner, the IATSR module 110 may also perform operations based on an intuitive approach to provide information to the user that is shown on a tab of an application on the display 105 being viewed. Based on the keyword based calculation, the IATSR module 110 may determine whether the tab being viewed corresponds to the keywords of the requested information. When the tab does not correspond to the requested information, the IATSR module 110 may determine that a different tab on the same or a different application, on the same or a different display 105, is to be shown to the user. In this manner, the IATSR module 110 may allow the user to quickly locate the most relevant application and/or tab that is shown on the display 105 that is holding the user's attention directed to the requested information that is being sought by the user.

In an exemplary implementation, the IATSR module 110 may utilize a variety of mechanisms to perform the keyword based calculation. For example, the IATSR module 110 may compare keywords using a weighted word list where the keywords may be identified using various techniques such as a word cloud. The weighted word list may rank the keywords to represent how two keywords are correlated to one another (e.g., similarity). In an exemplary implementation, the word cloud may identify similarity values between keywords. Illustratively, the word cloud may represent the keywords of the tabs, the applications, and the displays 105 as nodes where each node is positioned at determined locations from other nodes. The distance of one node to another node may indicate the similarity value. The IATSR module 110 may utilize various techniques (e.g., machine learning, artificial intelligence, etc.) to create a lexicon or dictionary of keywords through various modeling techniques (e.g., via neural network). When determining whether to update the view on the displays 105, the IATSR module 110 may input the user operation context (e.g., the search request entered in the search field of the interface of the IATSR module 110) or a keyword thereof into the word cloud to determine a keyword within the word cloud having a greatest similarity value thereto. However, it is again noted that the use of the word cloud is only exemplary. The exemplary embodiments may utilize any weighted word list where keywords are identified using any of a variety of keyword extraction algorithms using, for example, natural language processing. The IATSR module 110 may utilize the data structure to further identify the display 105, the application, and the tab that corresponds to the keyword having the greatest similarity value. Accordingly, when a search input is made to find the correct tab/application, the keyword based calculation may identify the application and then further the tab that is to be shown in an emphasized manner (e.g., moving the determined tab to the display 105 that is being viewed by the user).

The exemplary embodiments are described with regard to the IATSR module 110 being incorporated in the smart device 100. However, the incorporation of the IATSR module 110 into the smart device 100 is only illustrative. According to another exemplary implementation, the IATSR module 110 may be provided via various connections to remote components where the above noted operations are provided by a plurality of components in a remote manner. For example, the IATSR module 110 may be embodied in a server that provides the functionalities described above. The smart device 100 and the server providing the features of the IATSR module 110 may be interconnected via a network. In this manner, the smart device 100 may be part of a network or a cloud where implementation thereto is illustrated with reference to FIG. 5 (e.g., the device 100 according to the exemplary embodiments being represented by the laptop computer 54C).

When implemented in a network or cloud with the IATSR module 110 being part of a remote component such as a server, the smart device 100 may include a program to provide information regarding the displays 105, the applications, and the tabs as well as the user operation context to the server. As a result of the server processing the information in a manner consistent with the above description of the IATSR module 110, the program may receive an output to which an update to the views on the displays 105 may be performed. Accordingly, in this exemplary implementation, the program and the server may be in a client-server relationship over any type of connection such as over the network or cloud, Bluetooth, 2.4 gHz and 5 gHz internet, near-field communication, Z-Wave, Zigbee, etc.

Figure 2:
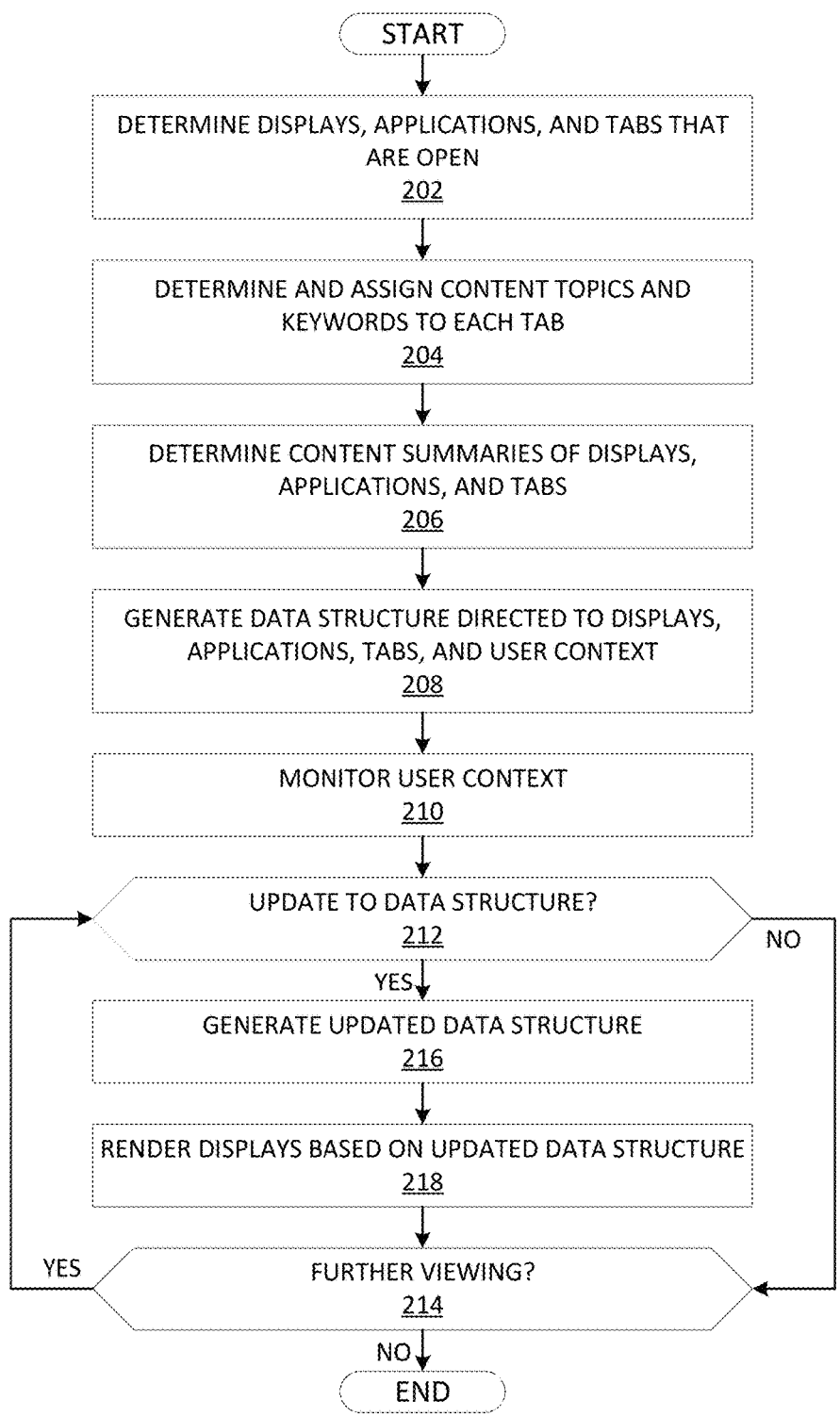
FIG. 2 depicts an exemplary flowchart of a method 200 illustrating the operations of an intelligent application-tab stack rendering module 110 incorporated in the smart device 100 in rendering a plurality of applications and tabs thereof on a plurality of displays, in accordance with the exemplary embodiments.

FIG. 2 depicts an exemplary flowchart of a method 200 illustrating the operations of the IATSR module 110 incorporated in the smart device 100 in rendering a plurality of applications and tabs thereof on a plurality of displays 105, in accordance with the exemplary embodiments. The method 200 may relate to operations that are performed by the identifier program 115, the monitoring program 120, and the GUI 125 of the IATSR module 110. The method 200 will be described from the perspective of the IATSR module 110.

Initially, there may be a plurality of applications that have been opened across the displays 105 where each of the applications may have a plurality of tabs that have been opened. The method 200 is described with respect to a time period where a plurality of applications and a plurality of tabs are open across the displays 105. However, the method 200 may be used at any time that a user is viewing the displays 105.

The IATSR module 110 may determine the displays 105, the applications, and the tabs that are currently open (step 202). As described above, the IATSR module 110 may operate on an OS level. Therefore, the IATSR module 110 may have access to information on the OS level including for hardware and software being used on the smart device 100. In this manner, the IATSR module 110 may determine that a plurality of displays 105 provide an overall view to the user where each of the displays 105 may include at least one application where each of the at least one application may include at least one tab. It is again noted that the use of a plurality of displays is only exemplary and the smart device 100 may only be configured with a single display 105. It is also again noted that each of the displays 105 showing at least one application is only exemplary and the at least one application may be shown on select ones of the displays 105. It is further again noted that each application include a plurality of tabs is only exemplary and an application may only include a single tab. Accordingly, at a given moment that the IATSR module 110 performs the operations according to the exemplary embodiments, any of a variety of conditions may be present. However, for exemplary purposes and to illustrate the features of the exemplary embodiments, the method 200 is described with regard to a plurality of the displays 105, a plurality of applications, and a plurality of tabs on the applications where each of the displays 105 includes at least one application. The IATSR module 110 may also uniquely identify each of the displays 105, the applications, and the tabs (e.g., assigning a unique identifier).

The IATSR module 110 may determine information in each tab and assign keywords associated with the information for each tab (step 204). The IATSR module 110 may be configured with a variety of techniques that may analyze and process the information in each tab. For example, the IATSR module 110 may be equipped with a NLP mechanism, a voice analysis mechanism, a video analysis mechanism, an image analysis mechanism, etc. In utilizing these various techniques, the IATSR module 110 may determine at least one keyword (e.g., keywords, content topics, etc.) to which the information in the tab corresponds. The IATSR module 110 may also determine a particular weight that the keyword is associated to the tab (e.g., based on a frequency with which that keyword appears in the tab). The IATSR module 110 may assign the keywords to the tabs (e.g., along with any associated weights). Through assigning the keywords, a keyword based calculation may be utilized for subsequent operations.

The IATSR module 110 may determine summarized content for the tabs, the applications, and the displays 105 (step 206). The summarized content may be directed to the entire content of the information. For example, the keywords may be used to generate the summarized content (e.g., each keyword is measured with its weight so that the summarized content is a summary of all keywords and their relevance to the information). For a tab, the IATSR module 110 may determine the summarized content based on the information in the tab. For an application, the IATSR module 110 may determine the summarized content based on the summarized content of the tabs of that application. For one of the displays 105, the IATSR module 110 may determine the summarized content based on the summarized content of the applications being shown on that display 105.

The IATSR module 110 may generate a data structure directed to the displays 105, the applications, and the tabs, as well as other information such as the user operation context (step 208). The data structure may include a plurality of information used in rendering the view on the displays 105 for the applications and the tabs. For example, the data structure may include the displays 105 along with the unique identifiers, the applications along with the unique identifiers, the tabs along with the unique identifiers, the keywords respective to each, and user operation context such as a currently viewed one of the displays 105, a current topic of interest, etc.

In an exemplary implementation, the IATSR module 110 may also use the data structure to generate a weighted word list by extracting keywords (e.g., using a word cloud). When utilizing the word cloud, the word cloud may determine positions of nodes representing the various keywords of the tabs, the applications, and the displays 105. As described above, the word cloud may be generated through various techniques and mechanisms such as machine learning, modeling, etc. The word cloud may position the nodes of the keywords such that a distance between keywords may define a similarity value between the keywords. The similarity value may range from a lowest value (e.g., 0) indicating no similarity therebetween to a highest value (e.g., 1) indicating a likely identical meaning of the keywords. Thus, a distance between two keywords in the word cloud having a relatively long distance may indicate a low similarity value whereas a distance between two keywords in the word cloud having a relatively short distance or even co-located may indicate a high similarity value. It is again noted that the use of the word cloud is only for illustrative purposes and the exemplary embodiments may utilize any natural language processing or other language processing technique to identify keywords and to subsequently analyze weights to be associated with the keywords.

The IATSR module 110 may monitor the user operation context (step 210). As described above, the user operation context may be determined in a variety of manners. For example, in a direct manner, the user may utilize the interface of the IATSR module 110 to enter a search request corresponding to requested information in a search field where the search request provides search keywords. In another example, in an indirect manner, the IATSR module 110 may utilize information collected by the smart device 100 (e.g., keystrokes, via sensors such as an eye tracking device, etc.) to determine requested information that the user is likely to request. The IATSR module 110 may determine search keywords based on the determined requested information.

The IATSR module 110 may determine whether to update the data structure (decision 212). More specifically, the IATSR module 110 may determine whether an update to the data structure will require an update to a view on the displays 105. The IATSR module 110 may incorporate the user operation context collected from a previous time (e.g., when the data structure was last updated) to a current time. The IATSR module 110 may also determine whether the updated data structure includes indications that the view on the displays 105 is to be modified. For example, with a direct user operation context in which the user provides a search request in the search field of the interface of the IATSR module 110, the IATSR module 110 may determine that the view on the displays 105 will likely be modified since the current tab being viewed has a low probability of including the requested information. Instead, another tab that is possibly on another application that is possibly on another one of the displays 105 may include the requested information.

As a result of no changes to the data structure or changes to the data structure that do not require modification of the view on the displays 105 (decision 212, "NO" branch), the IATSR module 110 may determine whether the user is continuing to view the displays 105 (decision 214). For example, the sensors of the smart device 100, activity on the applications/tabs, etc. may indicate whether the user is continuing to view the displays 105. As a result of the user concluding viewing (decision 214, "NO" branch), the IATSR module 110 may suspend further operations. However, the IATSR module 110 may perform post-operations such as saving the current data structure (e.g., assuming the smart device 100 is still activated) to continue when the user returns to viewing the displays 105. As a result of the user continuing viewing (decision 214, "YES" branch), the IATSR module 110 returns to determining whether to update the data structure (decision 212).

As a result of determining to update the data structure or determining changes to the data structure that do require modification of the view on the displays 105 (decision 212, "YES" branch), the IATSR module 110 may generate the updated data structure (step 216). As noted above, the data structure may include user operation context information. In updating the data structure, the IATSR module 110 may utilize the weighted word list. For example, when using a word cloud, the search keywords of the requested information may be positioned in the word cloud to determine a nearest node corresponding to a keyword of the tabs/applications/displays 105. In this manner, the IATSR module 110 may determine a tab belonging to an application being shown on one of the displays 105 that corresponds to the requested information. The IATSR module 110 may therefore update the data structure so that this determined tab is positioned appropriate for the user to view, in particular, on the display 105 that is currently being viewed.

The IATSR module may render the application-tab stacks on the displays 105 based on the updated data structure (step 218). Using the updated data structure, the rendering daemon of the IATSR module 110 may apply appropriate changes to the applications and the tabs thereof across the displays 105 so that the determined tab is shown to the user (e.g., in a prominent or emphasized manner). For example, the rendering daemon may move the application and select the determined tab over all other applications on the appropriate display 105. Accordingly, the rendering daemon may position applications and tabs in a foreground or background. In another example, the rendering daemon may exchange positions of applications such that the determined tab is shown to the user on the appropriate display 105 (e.g., a position of a currently viewed application is exchanged with a position of an identified application with the determined tab, whether on the same display 105 or across displays 105). The manner in which the rendering daemon may apply the appropriate changes will be described in further detail.

Figure 3:
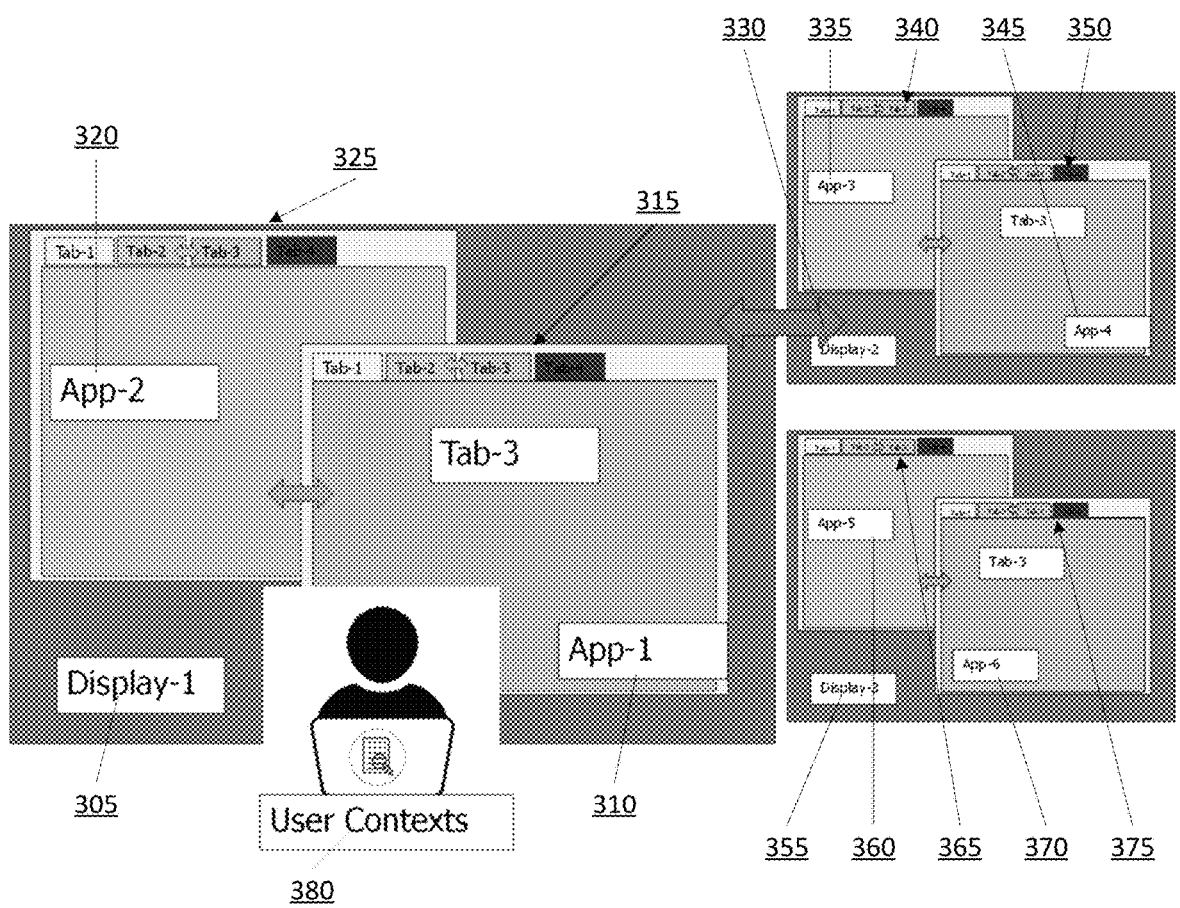
FIG. 3 depicts an exemplary scenario to render a plurality of applications and tabs thereof on a plurality of displays, in accordance with the exemplary embodiments.

To further illustrate the operations of the IATSR module 110, reference is now made to an illustrative exemplary embodiment. According to the illustrative exemplary embodiment, the IATSR mechanism as performed by the IATSR module 110 may render the stacks on the displays 105. FIG. 3 depicts an exemplary scenario 300 to render a plurality of applications and tabs thereof on a plurality of displays, in accordance with the exemplary embodiments.

As illustrated in FIG. 3, the smart device 100 may be represented with respect to the view as shown to a user via the displays 105. In the scenario 300, the overall view may comprise a first view via a first display 305 (e.g., assigned identifier D1), a second view via a second display 330 (e.g., assigned identifier D2), and a third view via a third display 355 (e.g., assigned identifier D13. Accordingly, the displays 105 of the smart device 100 may include three separate displays 305, 330, 355. On the first display 305, the first view may include a first application 310 (e.g., assigned identifier A1) having a plurality of tabs 315 (e.g., assigned identifiers T1, T2, T3, T4 linked to A1) and a second application 320 (e.g., assigned identifier A2) having a plurality of tabs 325 (e.g., assigned identifiers T1, T2, T3, T4 linked to A2). On the second display 330, the second view may include a third application 335 (e.g., assigned identifier A3) having a plurality of tabs 340 (e.g., assigned identifiers T1, T2, T3, T4 linked to A3) and a fourth application 345 (e.g., assigned identifier A4) having a plurality of tabs 350 (e.g., assigned identifiers T1, T2, T3, T4 linked to A4). On the third display 355, the third view may include a fifth application 360 (e.g., assigned identifier A5) having a plurality of tabs 365 (e.g., assigned identifiers T1, T2, T3, T4 linked to A5) and a sixth application 370 (e.g., assigned identifier A6) having a plurality of tabs 375 (e.g., assigned identifiers T1, T2, T3, T4 linked to A6). For illustrative purposes, the applications 310, 320, 335, 345, 360, 370 are each shown with four tabs. However, the applications 310, 320, 335, 345, 360, 370 may have any number of tabs. In this manner, the scenario 300 may show a current state with the displays, the applications, and the tabs that are being used and open on the smart device 100. The IATSR module 110 may perform the above noted operations in determining and assigning keywords, determining summarized content for the displays/applications/tabs, and generating a data structure according to this current state. For example, with regard to the displays, applications, and tabs, the data structure for the scenario 300 may include [D1[A1 [T1, T2, T3, T4], A2[T1, T2, T3, T4]]], [D2[A3[T1, T2, T3, T4], A4[T1, T2, T3, T4]]], and [D3[A5[T1, T2, T3, T4], A6[T1, T2, T3, T4]]].

The user may also be currently viewing the first display 305. For example, as shown in scenario 300, the user may be utilizing the first application 310, and more specifically one of the tabs 315, namely A1-T3. With regard to the other applications, the second application 320 may currently be showing one of the tabs 325, namely A2-T2; the third application 335 may currently be showing one of the tabs 335, namely A3-T2; the fourth application 345 may currently be showing one of the tabs 350, namely A4-T3; the fifth application 360 may currently be showing one of the tabs 365, namely A5-T2; and the sixth application 370 may currently be showing one of the tabs 375, namely A6-T3. This information may also be indicated in the data structure. For example, the data structure may order the applications with a current application (e.g., on the foreground) being ordered with the remaining applications (e.g., in the background) on a display being ordered afterward. In another example, the data structure may order the tabs with a current tab of an application being ordered first with the remaining tabs being ordered afterward. Thus, in the scenario 300, the data structure may include [D1[A1 [T3, T1, T2, T4], A2[T2, T1, T3, T4]]], [D2[A4[T3, T1, T2, T4], A3[T2, T1, T3, T4]]], and [D3[A6[T3, T1, T2, T4], A5[T2, T1, T3, T4]]].

Furthermore, the user may be entering user operation contexts 380 that are being monitored by the IATSR module 110. Accordingly, the IATSR module 110 may update the data structure with the user operation contexts 380. For example, the user may recall having opened a tab in one of the applications regarding a concept but may not remember exactly which tab on which application. Thus, in the scenario 300, the user may utilize the features of the exemplary embodiments through the user operation context 380 including the user entering a search request corresponding to the concept on one of the currently opened one of the tabs 315 (e.g., A1-T3) of the application 310 on the first display 305. The search request may include search keywords associated therewith. The IATSR module 110 may utilize a weighted word list for the keywords in the tabs, the applications, and the displays to determine whether any of the tabs that are currently open has information corresponding to the search keywords.

In the scenario 300, the IATSR module 110 may determine that the search keywords appear in another open tab. In using a keyword based calculation algorithm (e.g., where keywords are identified via a word cloud or other technique) to obtain keywords with corresponding weights, the IATSR module 110 may be configured to narrow the search field to a display, to an application in that display, and to a tab in that application. For example, the IATSR module 110 may have determined that the search keyword appears in one of the tabs 365 (e.g., A5-T4) of the fifth application 360 being shown on the third display 355. In the scenario 300 and according to an exemplary implementation, the IATSR module 110 may perform an exchange of positions such that the determined tab is shown to the user on the display being viewed. For example, as a result of a different tab on the same application being viewed, the IATSR module 110 may simply change the current tab to the determined tab. With the application on which these tabs belong being viewed on a particular display, no further change may be required. In another example, as a result of determining a tab on a different application than the current application being viewed where the determined application and the current application are being shown on the same display, the IATSR module 110 may exchange positions between background and foreground where the determined application is pulled to the foreground and the current application is pulled to the background. In a further example, as a result of determining a tab on a different application than the current application being viewed where the determined application and the current application are being shown on different displays, the IATSR module 110 swaps positions from one display to another where the determined application on a display not being viewed is moved to the position of the current application and the current application is moved to the former position of the determined application. With regard to the scenario 300, using the above exemplary implementation, the IATSR module 110 may update the data structure accordingly such that the rendering daemon may utilize the updated data structure to render the appropriate view on the displays. For example, the IATSR module 110 may update the application-tab stack order of the fifth application 360 (e.g., A5[T4, T1, T2, T3]). In another example, the IATSR module 110 may update the display to perform the swap in positions. Specifically, the updated data structure may be [D1[A5[T4, T1, T2, T3], A2[T2, T1, T3, T4]]], [D2[A4[T3, T1, T2, T4], A3[T2, T1, T3, T4]]], and [D3[A6[T3, T1, T2, T4], A1[T3, T1, T2, T4]]]. Through this updated data structure, the fifth application 360 may have the correct one of the tabs 365 (e.g., A5-T4) to be open and moved to the first display 305 which is being viewed by the user.

The IATSR module 110 may also be configured with features to further intelligently show the requested information to the user. For example, the information in the determined tab may span a substantial distance (e.g., requires the user to scroll through the page, requires the user to select a slide or page in the document, etc.). In determining the tab that includes the requested information, the IATSR module 110 may further determine a location in the tab which includes the requested information when such a determination may be appropriate. For example, if the requested information is only mentioned in a relatively small subset of the information in the determined tab, the IATSR module 110 may locate this subset within the information of the determined tab. In another example, if the requested information is related to a majority of the information in the determined tab, the IATSR module 110 may omit this operation. Thus, when appropriate, the IATSR module 110 may further position the application in the appropriate display with the determined tab open and a location in the determined tab corresponding to the requested information.

The exemplary embodiments are configured to intelligently render an application-tab stack for a plurality of applications across a plurality of displays. In maintaining a data structure including information of the various displays, the applications, and the tabs of the applications along with other pertinent information such as a current state of the displays/applications/tabs, user operation context, etc., the exemplary embodiments may determine how to render the view on the displays to show a relevant tab on a display being viewed by the user. As the exemplary embodiments are configured to modify the view through reordering a position of the applications and tabs across the displays, the user may continuously be provided the most relevant information that is requested as the view across the displays is based on the user operation context.

Figure 4:
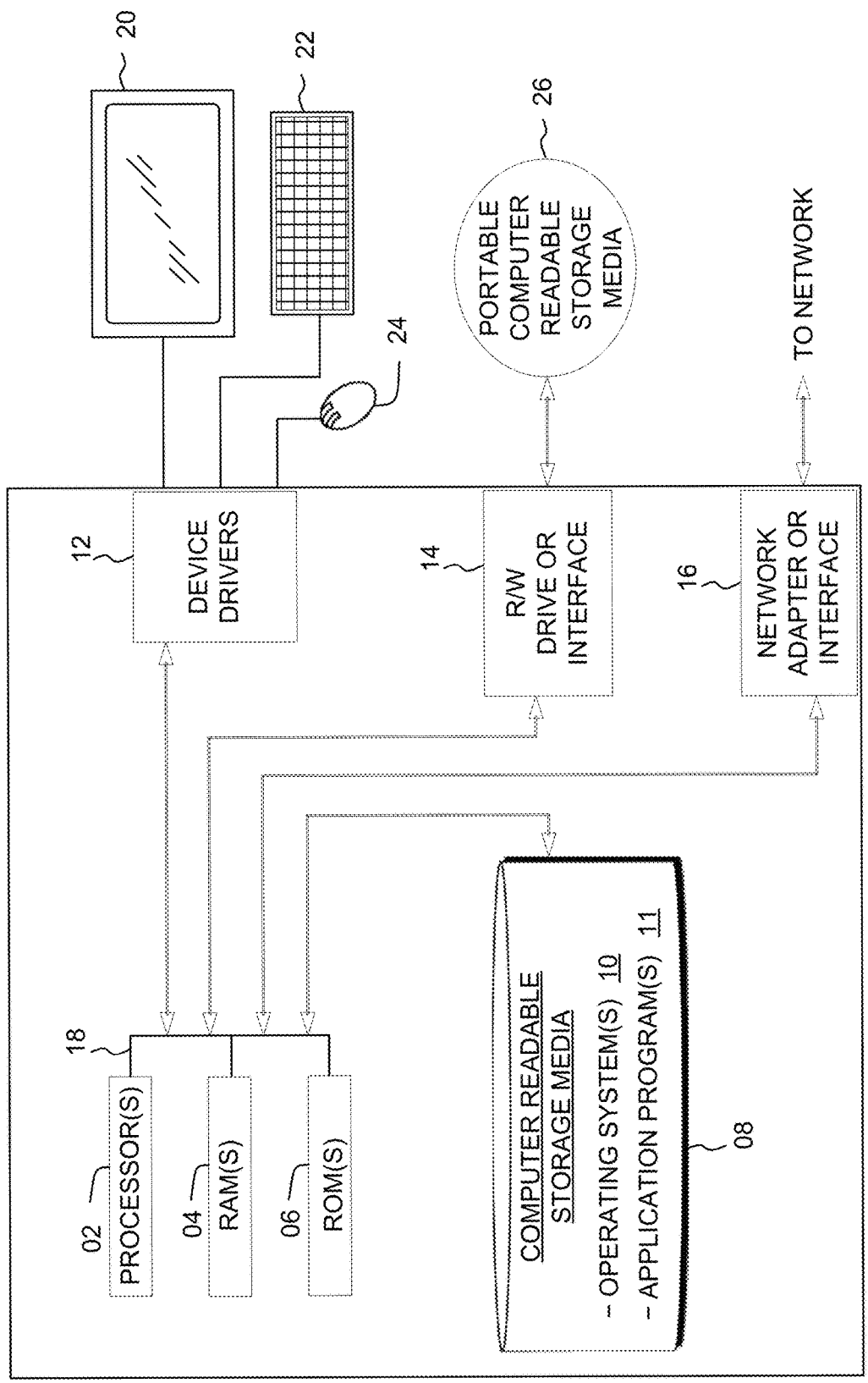
FIG. 4 depicts an exemplary block diagram depicting the hardware components of the smart device 100 of FIG. 1, in accordance with the exemplary embodiments.

FIG. 4 depicts a block diagram of devices within the smart device 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, RAY drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
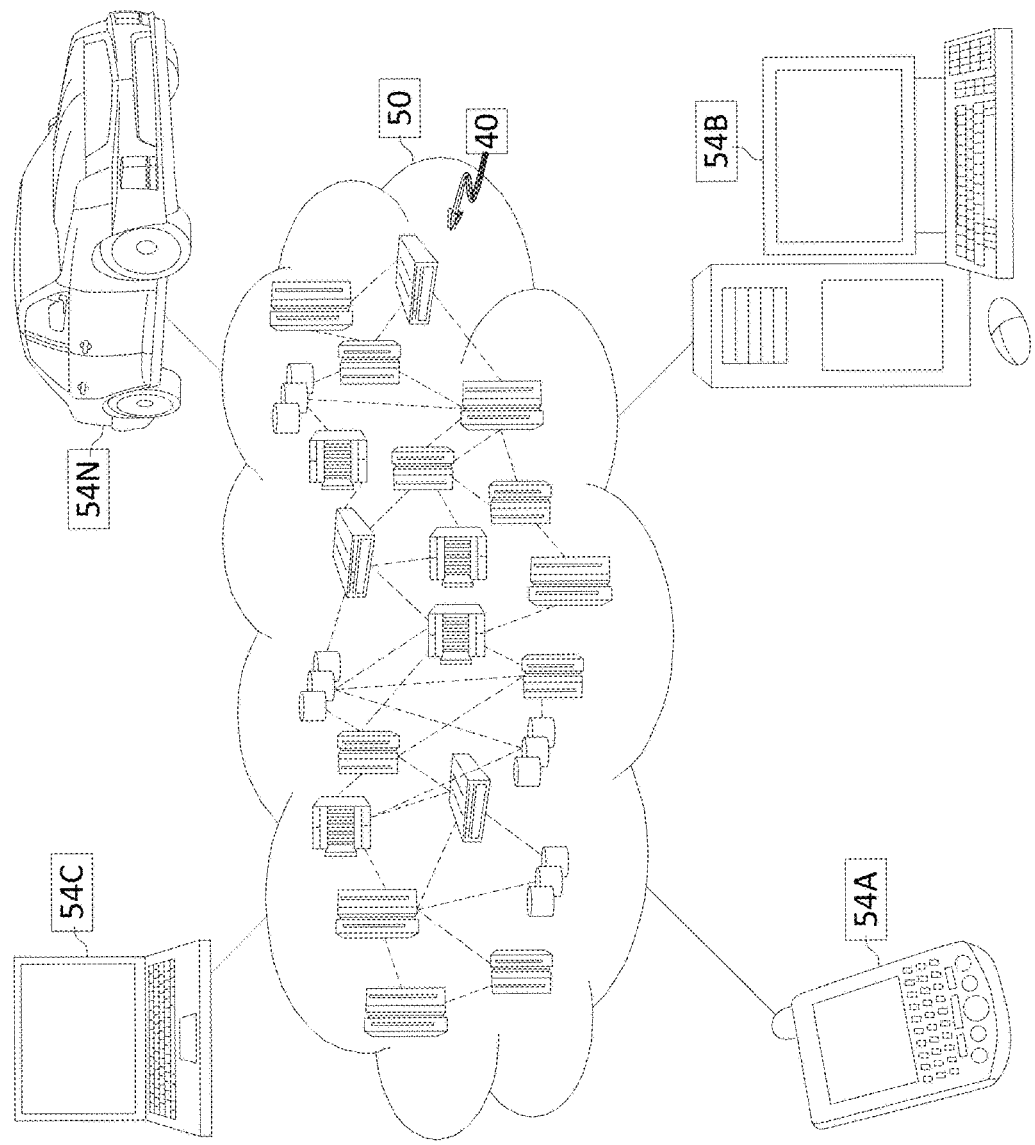
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
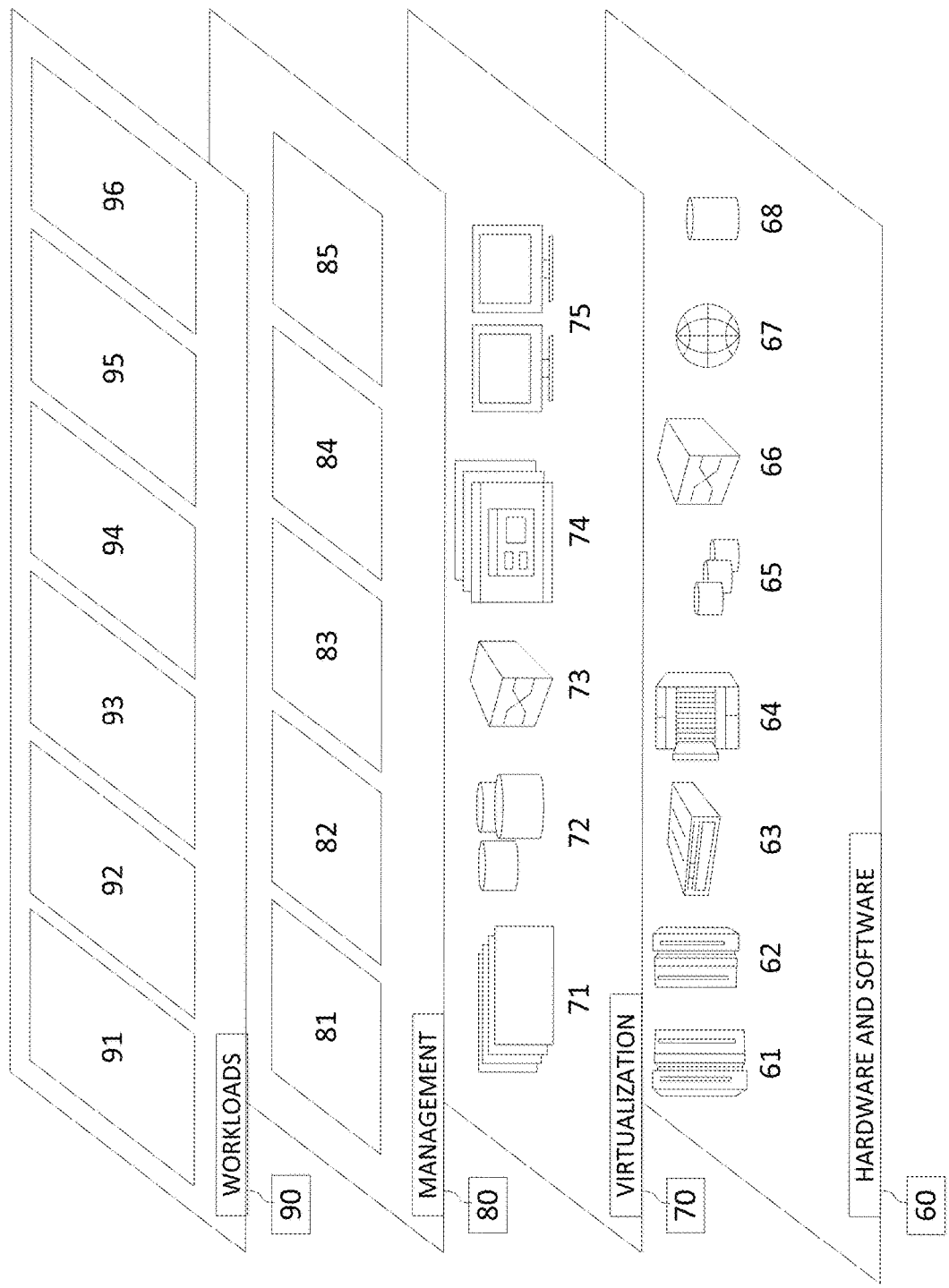
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and rendering processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for rendering a plurality of applications and tabs thereof on a plurality of displays performed by an intelligent application-tab stack rendering (IATSR) module operating at an operating system level, the method comprising:
   determining the applications and the tabs thereof that are open across the displays;
   determining keywords associated with the tabs;
   generating a summarized content for the tabs, the applications, and the displays based on the keywords, wherein the summarized content of at least one of the applications comprises the summarized content of the tabs comprising the application, and the summarized content of at least one of the displays comprises the summarized content of the applications shown on that display;
   generating a data structure corresponding to a current view across the displays comprising information associated with the displays, the applications, the tabs, and the summarized content;
   monitoring a user operation context provided by a user, the user operation context indicative of requested information, the requested information being included in a selected tab among the tabs;
   updating the data structure with the user operation context, the updated data structure indicative of the selected tab, one of the applications to which the selected tab belongs, and one of the displays on which the one of the applications is being shown; and
   rendering an updated view across the displays in which the selected tab is positioned to be viewed by the user.

2. The computer-implemented method of claim 1, further comprising:
   determining a search keyword based on the requested information; and
   determining the selected tab based on a keyword based calculation, the keyword based calculation comparing the search keyword to the keywords associated with the tabs.

3. The computer-implemented method of claim 2, wherein the keyword based calculation is based on a weighted word list corresponding to the keywords associated with the tabs, the selected tab having one of the keywords with a determined correlation to the search keyword.

4. The computer-implemented method of claim 1, wherein the summarized content for one of the tabs is based on the keywords associated with the one of the tabs, the summarized content for one of the applications is based on the summarized content of the tabs thereof, and the summarized content of the displays is based on the ones of the applications being shown thereon.

5. The computer-implemented method of claim 1, wherein the keywords for one of the tabs are weighted based on a frequency with which the keyword appears in the one of the tabs.

6. The computer-implemented method of claim 1, wherein the updated view is rendered so that the selected tab is positioned on a currently viewed one of the displays.

7. The computer-implemented method of claim 1, wherein the requested information is based on a search input provided on a search field in one of a search field provided by the IATSR module or one of the tabs.

8. A non-transitory computer-readable storage media that configures a computer to perform program instructions stored on the non-transitory computer-readable storage media for rendering a plurality of applications and tabs thereof on a plurality of displays by an intelligent application-tab stack rendering (IATSR) module operating at an operating system level, the program instructions comprising:
   determining the applications and the tabs thereof that are open across the displays;
   determining keywords associated with the tabs;
   generating a summarized content for the tabs, the applications, and the displays based on the keywords, wherein the summarized content of at least one of the applications comprises the summarized content of the tabs comprising the application, and the summarized content of at least one of the displays comprises the summarized content of the applications shown on that display;
   generating a data structure corresponding to a current view across the displays comprising information associated with the displays, the applications, the tabs, and the summarized content;
   monitoring a user operation context provided by a user, the user operation context indicative of requested information, the requested information being included in a selected tab among the tabs;
   updating the data structure with the user operation context, the updated data structure indicative of the selected tab, one of the applications to which the selected tab belongs, and one of the displays on which the one of the applications is being shown; and
   rendering an updated view across the displays in which the selected tab is positioned to be viewed by the user.

9. The computer program product of claim 8, wherein the program instructions further comprise:
   determining a search keyword based on the requested information; and determining the selected tab based on a keyword based calculation, the keyword based calculation comparing the search keyword to the keywords associated with the tabs.

10. The computer program product of claim 9, wherein the keyword based calculation is based on a weighted word list corresponding to the keywords associated with the tabs, the selected tab having one of the keywords with a determined correlation to the search keyword.

11. The computer program product of claim 8, wherein the summarized content for one of the tabs is based on the keywords associated with the one of the tabs, the summarized content for one of the applications is based on the summarized content of the tabs thereof, and the summarized content of the displays is based on the ones of the applications being shown thereon.

12. The computer program product of claim 8, wherein the keywords for one of the tabs are weighted based on a frequency with which the keyword appears in the one of the tabs.

13. The computer program product of claim 8, wherein the updated view is rendered so that the selected tab is positioned on a currently viewed one of the displays.

14. The computer program product of claim 8, wherein the requested information is based on a search input provided on a search field in one of a search field provided by the IATSR module or one of the tabs.

15. A computer system for rendering a plurality of applications and tabs thereof on a plurality of displays by an intelligent application-tab stack rendering (IATSR) module operating at an operating system level, the computer system comprising:
    one or more computer processors, one or more computer-readable storage media, and program instructions stored on the one or more of the computer-readable storage media for execution by at least one of the one or more processors capable of performing a method, the method comprising:
        determining the applications and the tabs thereof that are open across the displays;
        determining keywords associated with the tabs;
        generating a summarized content for the tabs, the applications, and the displays based on the keywords, wherein the summarized content of at least one of the applications comprises the summarized content of the tabs comprising the application, and the summarized content of at least one of the displays comprises the summarized content of the applications shown on that display;
        generating a data structure corresponding to a current view across the displays comprising information associated with the displays, the applications, the tabs, and the summarized content;
        monitoring a user operation context provided by a user, the user operation context indicative of requested information, the requested information being included in a selected tab among the tabs;
        updating the data structure with the user operation context, the updated data structure indicative of the selected tab, one of the applications to which the selected tab belongs, and one of the displays on which the one of the applications is being shown; and
        rendering an updated view across the displays in which the selected tab is positioned to be viewed by the user.

16. The computer system of claim 15, wherein the method further comprises:
    determining a search keyword based on the requested information; and
    determining the selected tab based on a keyword based calculation, the keyword based calculation comparing the search keyword to the keywords associated with the tabs.

17. The computer system of claim 16, wherein the keyword based calculation is based on a weighted word list corresponding to the keywords associated with the tabs, the selected tab having one of the keywords with a determined correlation to the search keyword.

18. The computer system of claim 15, wherein the summarized content for one of the tabs is based on the keywords associated with the one of the tabs, the summarized content for one of the applications is based on the summarized content of the tabs thereof, and the summarized content of the displays is based on the ones of the applications being shown thereon.

19. The computer system of claim 15, wherein the keywords for one of the tabs are weighted based on a frequency with which the keyword appears in the one of the tabs.

20. The computer system of claim 15, wherein the updated view is rendered so that the selected tab is positioned on a currently viewed one of the displays.

* * * * *